(12) United States Patent
Liang et al.

(10) Patent No.: US 10,592,579 B2
(45) Date of Patent: Mar. 17, 2020

(54) METHOD AND DEVICE FOR SCALING FONT SIZE OF PAGE IN MOBILE TERMINAL

(71) Applicant: UC MOBILE LIMITED, Beijing (CN)

(72) Inventors: Jie Liang, Beijing (CN); Yongfu Yu, Beijing (CN); Xiaopeng He, Beijing (CN); Shunyan Zhu, Beijing (CN); Chao Zhou, Beijing (CN)

(73) Assignee: UC MOBILE LIMITED, Beijing (CN)

( * ) Notice: Subject to any disclaimer, the term of this patent is extended or adjusted under 35 U.S.C. 154(b) by 21 days.

(21) Appl. No.: 14/745,235

(22) PCT Filed: Oct. 31, 2013

(86) PCT No.: PCT/CN2013/083035
§ 371 (c)(1),
(2) Date: Jun. 19, 2015

(87) PCT Pub. No.: WO2014/094459
PCT Pub. Date: Jun. 26, 2014

(65) Prior Publication Data
US 2015/0331962 A1    Nov. 19, 2015

(30) Foreign Application Priority Data

Dec. 20, 2012    (CN) .......................... 2012 1 0559777

(51) Int. Cl.
*G06F 17/20*    (2006.01)
*G06F 16/957*    (2019.01)
(Continued)

(52) U.S. Cl.
CPC ........ *G06F 16/9577* (2019.01); *G06F 17/214* (2013.01); *G06F 17/2247* (2013.01); *G06F 17/2705* (2013.01)

(58) Field of Classification Search
CPC ............. G06F 17/2705; G06F 17/2247; G06F 17/214; G06F 17/30905
(Continued)

(56) References Cited

U.S. PATENT DOCUMENTS 5,754,873 A * 5/1998 Nolan .................... G06F 3/0481
                                                                345/472
7,290,006 B2 * 10/2007 Xie .................... G06F 17/30905
(Continued)

FOREIGN PATENT DOCUMENTS

CN            102591853 A       7/2012
CN            102663126 A       9/2012
(Continued)

OTHER PUBLICATIONS

Dalgleish, "The Incredible Shrinking Excel Font", Oct. 5, 2011, Contextures Blog, Main Page, located at http://blog.contextures.com/archives/2011/10/05/the-incredible-shrinking-excel-font/, pp. 1-4.*
(Continued)

*Primary Examiner* — Keith D Bloomquist
(74) *Attorney, Agent, or Firm* — Alston & Bird LLP

(57) ABSTRACT

Techniques for scaling font size of a page in a mobile terminal, such as a method including: parsing a page of a web page acquired from a content server, and acquiring the block width and the size of a style font of each underlying block node contained in a render tree of the parsed web page; based on the acquired block width of each underlying block node and the width of a screen of the mobile terminal, determining a font scaling coefficient of each underlying block node; and based on the determined font scaling coefficient of each underlying block node and the size of the style font, scaling the style font of each underlying block node. Advantageously, an enlarged window can completely
(Continued)

display a content block and a font can be displayed clearly, without a need to slide the screen to the left or right side.

17 Claims, 7 Drawing Sheets

(51) Int. Cl.
  *G06F 17/22* (2006.01)
  *G06F 17/27* (2006.01)
  *G06F 17/21* (2006.01)

(58) Field of Classification Search
  USPC .......................................................... 715/249
  See application file for complete search history.

(56) References Cited

U.S. PATENT DOCUMENTS

| | | | | |
|---|---|---|---|---|
| 7,337,392 | B2 * | 2/2008 | Lue .................... | G06F 17/30905 707/E17.121 |
| 7,873,901 | B2 * | 1/2011 | Chen ................. | G06F 17/30905 715/234 |
| 9,195,637 | B2 * | 11/2015 | Peraza ................. | G06F 17/214 |
| 2004/0148571 | A1 * | 7/2004 | Lue ..................... | G06F 16/9577 715/239 |
| 2006/0279566 | A1 * | 12/2006 | Atkins .................. | G06F 17/211 345/418 |
| 2009/0183068 | A1 * | 7/2009 | Bard .................. | G06F 17/30905 715/252 |
| 2010/0011287 | A1 * | 1/2010 | Osaka ................... | G06F 17/212 715/251 |
| 2011/0202829 | A1 * | 8/2011 | Klassen ............ | G06F 17/30905 715/243 |
| 2012/0110433 | A1 * | 5/2012 | Pan ........................ | G06F 17/211 715/234 |
| 2012/0131437 | A1 * | 5/2012 | Zhu ................... | G06F 17/30905 715/234 |
| 2012/0192063 | A1 * | 7/2012 | Koren ............... | G06F 17/30905 715/252 |
| 2013/0124953 | A1 * | 5/2013 | Fan ....................... | G06F 17/212 715/202 |

FOREIGN PATENT DOCUMENTS

| | | |
|---|---|---|
| CN | 102779167 A | 11/2012 |
| CN | 103064920 A | 4/2013 |

OTHER PUBLICATIONS

W3Schools, "CSS Font", as published on Jan. 6, 2013 at www.W3Schools.com, obtained via the Internet Archive Wayback Machine from https://web.archive.org/web/20130106234043/https://www.w3schools.com/css/css_font.asp, pp. 1-4.*
Dalgleish, "The Incredible Shrinking Excel Font", published Oct. 5, 2011 at http://blog.contextures.com/archives/2011/10/05/the-incredible-shrinking-excel-font/.*
International Search Report and Written Opinion from International Application No. PCT/CN2013/083035 dated Dec. 12, 2013.
Office Action from corresponding Chinese Patent Application No. 201210559777.2 dated Sep. 27, 2016.

* cited by examiner

Scaling font size of page device 800

Font Scaling Unit 830

METHOD AND DEVICE FOR SCALING FONT SIZE OF PAGE IN MOBILE TERMINAL

CROSS-REFERENCE TO RELATED APPLICATIONS

The present application is a U.S. National Stage of International Application No. PCT/CN2013/083035, filed Oct. 31, 2013, which claims the benefit of Chinese Patent Application No. 201210559777.2, titled "Method and device for scaling font size of page in mobile terminal, filed Dec. 20, 2012, each of which is incorporated by reference herein in its entirety.

FIELD

The present invention relates to the field of mobile communication, and more specifically, relates to a method and device for scaling the font size of a page in a mobile terminal.

BACKGROUND

Nowadays, when people use a touch screen or non-touch screen mobile terminal to view a web page, due to the fact that the physical size of the screen of a mobile terminal is typically quite smaller in comparison to that of the screen of a personal computer (PC), and that the pages of many traditional web pages have been originally designed for a PC screen, the fonts on the pages of these web pages shown with a mobile browser become unclear or fuzzy, which results in the issue that it is difficult for a user to clearly read the content on the page when the user uses a mobile device to view a traditional WWW web page. FIG. 1 is a schematic view that shows the screen display of a mobile terminal in the case when a page of a traditional web page is viewed with a normal mobile terminal browser.

In order to allow a user to be able to clearly view the content on a page of web page, a mobile terminal browser has been proposed accordingly. Through a scaling process for a page shown on the screen of a mobile terminal, the proposed mobile terminal browser can make the fonts of the page be clearly shown on the screen of the mobile terminal. However, in such a case, following the scaling process, the width of the page of web page is usually much larger than the actual width of the screen of the mobile terminal. As a result, an operation of sliding the page of web page to the left or right side is frequently needed in order to read the full page of web page, which leads to a poor user experience. FIGS. 2A and 2B are schematic views that respective show the screen display of a mobile terminal in the case that the pages of web pages shown through a mobile terminal browser following a scaling process alone without a rearrangement for the pages of the web pages.

In addition, in order to allow a user to be able to clearly view the content on a page of web page, another mobile terminal browser has been proposed as well. This mobile terminal browser treats the page of a web page through a new approach, namely, in addition to performing a similar scaling process, it further wraps the page to make a rearrangement, and in which the wrapping process is implemented based on the width of the particular screen. In this way, it is able to ensure that a full page is displayed within the range of the width of the respective screen without the need of a sliding operation to the left or right side. However, since such an approach needs a process of rearrangement, it may thus compromise the response rate. Moreover, such an approach may alter the layout of the page. In addition, every time when it scales a page based on a different scaling coefficient, a different page layout will be generated. This may cause discomfort to a user. FIG. 3A is a schematic view that shows the screen display of a mobile terminal in the case that the page of web page shown through a mobile terminal browser undergoes a rearrangement process following a scaling treatment. FIG. 3B is a schematic view that shows the screen display of a mobile terminal following a scaling process based on a scaling coefficient different from that used in FIG. 3A. As shown in FIGS. 3A and 3B, when scaled based on different scaling coefficient, the corresponding layouts shown on the screen of the same mobile terminal could be much different, which thus would bring a poor experience to a user.

BRIEF SUMMARY

In view of the issues mentioned above, an object of the present invention is to provide a method for scaling the font size of a page in a mobile terminal, which is able to categorize the underlying block nodes in a render tree of a page of web page, and then adopt different font scaling coefficients to scale respective font sizes for different underlying block nodes.

Another object of the present invention is to provide a device for scaling the font size of a page in a mobile terminal. In one aspect of the present invention, it provides a method for scaling the font size of a page in a mobile terminal, which comprises parsing a type setting processed web page acquired from a content server, and acquiring the block width and the size of style font of each underlying block node contained in a render tree of the parsed web page, wherein the underlying block nodes are the block nodes that do not contain sub-block node in the render tree of the web page; and then based on the acquired block width of each underlying block node and the width of a screen of a mobile terminal, determining a font scaling coefficient of each underlying block node; as well as based on the determined font scaling coefficient of each underlying block node and the size of a style font, scaling the style font of each underlying block node.

In one or a number of exemplary embodiments in the foregoing aspect of the present invention, the process of scaling the style font of each underlying block node based on the determined font scaling coefficient of each underlying block node and the acquired size of the style font of each underlying block node comprises calculating a scaled font size of each underlying block node based on the determined font scaling coefficient of each underlying block node and the acquired size of the style font of each underlying block node; as well as updating the size of style font of each underlying block node in the render tree of the web page based on the scaled font size of each underlying block node.

In one or a number of exemplary embodiments in the foregoing aspect of the present invention, font scaling coefficient of each underlying block node=block width of each underlying block node/width of a screen of a mobile terminal.

In one or a number of exemplary embodiments in the foregoing aspect of the present invention, following the process of based on the acquired block width of each underlying block node and the width of a screen of a mobile terminal, determining a font scaling coefficient of each underlying block node, the method further comprises the steps as follows: for each underlying block node, determining whether the previously determined font scaling coefficient of the underlying block node is greater than a first threshold; as well as in the case that the previously determined font scaling coefficient of the underlying block node is greater than the first threshold, based on the previously determined font scaling coefficient of each underlying block node and the acquired size of the style font of the underlying block node, scaling the style font of the underlying block node; alternatively, in the case that the previously determined font scaling coefficient of the underlying block node is not greater than the first threshold, not scaling the style font of the underlying block node.

In one or a number of exemplary embodiments in the foregoing aspect of the present invention, the underlying block node may comprise one or a plurality of sub-nodes; in addition, the process of based on the determined font scaling coefficient of each underlying block node and the acquired size of the style font of the underlying block node, scaling the style font of each underlying block node comprises the step as follows, for each sub-node in the underlying block node, determining whether the sub-node is a node of text; as well as in the case that the sub-node is a node of text, scaling the style font of the sub-node based on the determined font scaling coefficient and the acquired size of the style font of the sub-node.

In one or a number of exemplary embodiments in the foregoing aspect of the present invention, in the case that the text length of the text contained in the underlying block node is greater than a second threshold, scaling the underlying block node.

In one or a number of exemplary embodiments in the foregoing aspect of the present invention, following the steps of parsing a type setting processed web page acquired from a content server, and acquiring the block width of each underlying block node and the size of a style font contained in a render tree of the parsed web page, the method of the present invention further comprises the steps as follows, clustering the underlying block nodes contained in the render tree of the web page; and treating a plurality of underlying block nodes following the foregoing clustering process as a single cluster of block node, and then selecting the block width and the size of style font of any underlying block nodes of the plurality of underlying block nodes as the block width and the size of style font of the cluster of block node, wherein the cluster of block node meets the conditions set forth below: (1) the underlying block nodes of the cluster of block node are neighboring underlying block nodes; and (2) every underlying block node within the cluster of block node is included in the same father block node.

In another aspect of the present invention, a device for scaling the font size of a page in a mobile terminal is provided, which comprises a parsing unit, configured to parse a type setting processed web page acquired from a content server, and acquire the block width and the size of a style font of each underlying block node contained in a render tree of the parsed web page, wherein the underlying block nodes are the block nodes that do not contain sub-block nodes in the render tree of the web page; a font scaling coefficient determination unit, which is configured to determine a font scaling coefficient of each underlying block node based on the acquired block width of each underlying block node and the width of a screen of a mobile terminal; as well as a font scaling unit, which is configured to scale the style font of each underlying block node based on the determined font scaling coefficient of each underlying block node and the size of the style font.

In one or a number of exemplary embodiments in the foregoing aspect of the present invention, the font scaling unit comprises: a calculation module, configured to calculate a scaled font size of each underlying block node based on the determined font scaling coefficient of each underlying block node and the acquired size of the style font of each underlying block node; as well as an updating module, configured to update the size of style font of each underlying block node in the render tree of the web page based on the scaled font size of each underlying block node.

In one or a number of exemplary embodiments in the foregoing aspect of the present invention, the device for scaling font size of page in a mobile terminal may also comprise: a first determination unit, configured to determine whether the previously determined font scaling coefficient of the underlying block node is greater than a first threshold in respect of each underlying block node; as well as in the case that the previously determined font scaling coefficient of the underlying block node is greater than the first threshold, based on the previously determined font scaling coefficient of each underlying block node and the acquired size of the style font of the underlying block node, the font scaling unit is configured to scale the style font of the underlying block node; alternatively, in the case that the previously determined font scaling coefficient of the underlying block node is not greater than the first threshold, the font scaling unit is configured to not scale the style font of the underlying block node.

In one or a number of exemplary embodiments in the foregoing aspect of the present invention, the underlying block node may comprise one or a plurality of sub-nodes, as well as that the device for scaling font size of page in a mobile terminal may further comprise: a second determination unit, configured to determine whether the sub-node is a node of text, in respect of each sub-node in the underlying block node; as well as in the case that the sub-node is a node of text, the font scaling unit is configured to scale the style font of the sub-node based on the determined font scaling coefficient and the acquired size of the style font of the sub-node; alternatively, in the case that the sub-node is not a node of text, the font scaling unit is configured to not scale the style font of the sub-node.

In one or a number of exemplary embodiments in the foregoing aspect of the present invention, the device for scaling font size of page in a mobile terminal may further comprise: a third determination unit, configured to determine whether the text length of the text contained in the underlying block node is greater than a second threshold, as well as in the case that the text length of the text contained in the underlying block node is greater than the second threshold, the font scaling unit is configured to scale the underlying block node based on the determined font scaling coefficient of the underlying block node and the acquired size of the style font of the underlying block node; alternatively, in the case that the text length of the text contained in the underlying block node is not greater than the second threshold, the font scaling unit is configured to not scale the underlying block node.

Through the method for scaling font size of page according to the present invention, the font size of a web page may be scaled according to the ratio of the block width of an underlying block node/the width of the screen of a mobile terminal. In this way, after a double-click scaling, an enlarged window can completely display a content block and a font can be displayed clearly, without a need to slide the screen to the left or right side. In addition, there is no need to perform dynamic rearrangement on the scaled content block, thereby saving time on dynamic rearrangement and ensuring that a page layout will not change during the scaling process.

In order to achieve the objects mentioned above and the related objects thereof, one or a number of aspects of the present invention include the features that are going to be described in details next and specifically defined in the respective claims. The description and drawings set forth below in details of certain exemplary aspects of the present invention. However, these aspects merely indicate a few modes among the variety of different modes that are based on the principle of the present invention. In addition, the present invention is intended to encompass all of these aspects as well as equivalents thereof.

BRIEF DESCRIPTION OF THE DRAWINGS

The detailed description that is in reference to the drawings set forth below would make the objects mentioned above and other objects, characteristics and advantages of the present invention become obvious to understand.

Figure 1:
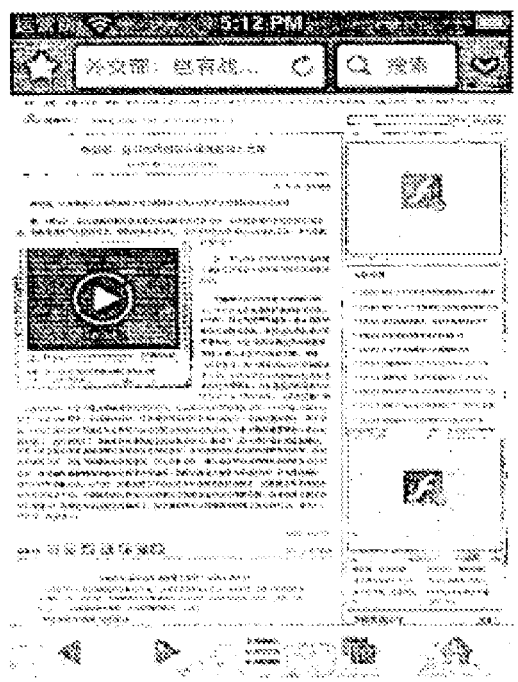
FIG. 1 is a schematic view of the screen display of a mobile terminal in the case that a page of a traditional web page is viewed through a conventional mobile terminal browser.
Figure 2A:
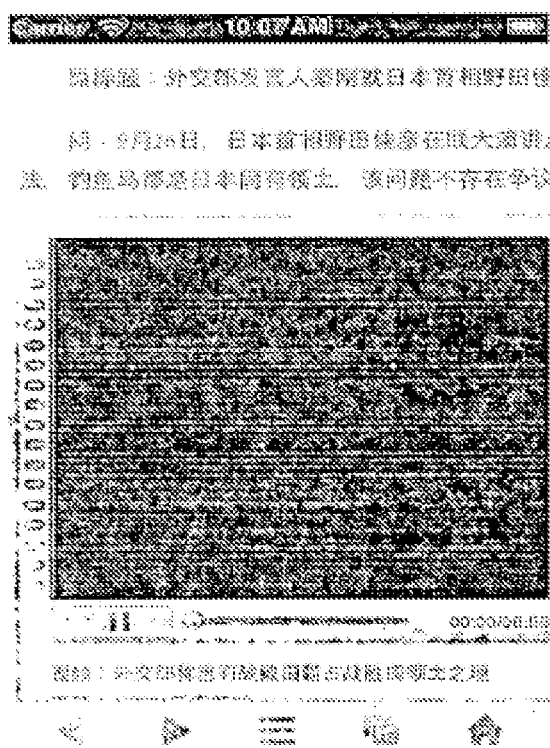
FIGS. 2A and 2B are schematic views that respective show the screen displays of a mobile terminal in the case that a web pages is shown through a mobile terminal browser following a scaling process alone without a rearrangement for the web page.
Figure 2B:
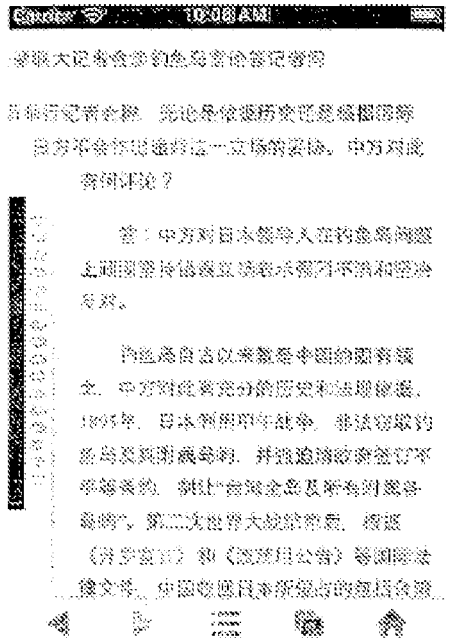
Figure 3A:
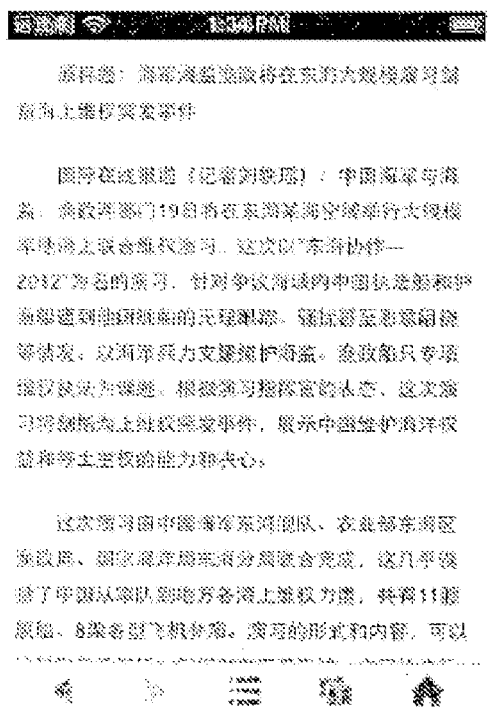
FIGS. 3A and 3B are schematic views that show the screen displays of a mobile terminal in the case that the web page shown through a mobile terminal browser undergoes a rearrangement process following a scaling process.
Figure 3B:
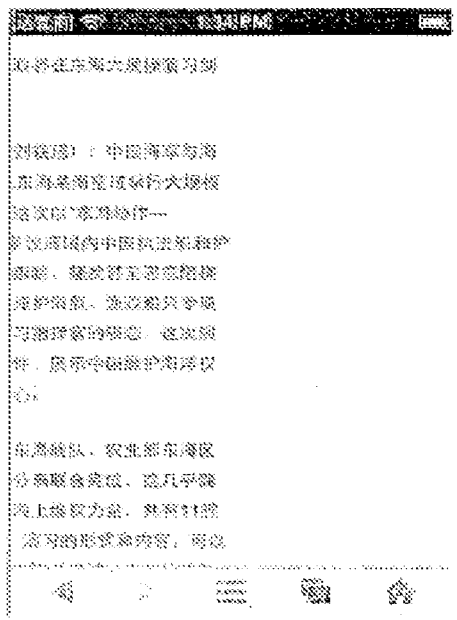

In all of the foregoing figures included in the drawings of the present invention, the same symbol refers to similar or corresponding feature or function.

DETAILED DESCRIPTION

The various aspects of the present invention are described below. It should be understood that the teachings herein may be implemented in a variety of different modes, and that any specific structure, function, or both disclosed herein is merely representative. Based on the teachings herein one skilled in the art would understand that an aspect disclosed herein may be implemented independently of any other aspects and that two or more aspects among these aspects may be combined in various ways. For example, any aspect of numbers disclosed herein may be used to achieve the device or practice of the present invention. In addition, other structures, functions, or the structures and functions beyond the one or a number of aspects disclosed in the present invention or other than the one or a number of aspects disclosed in the present invention may be used to achieve the device or practice the method of the present invention. Moreover, any aspect described herein may comprise at least one element of a claim.

Figure 4:
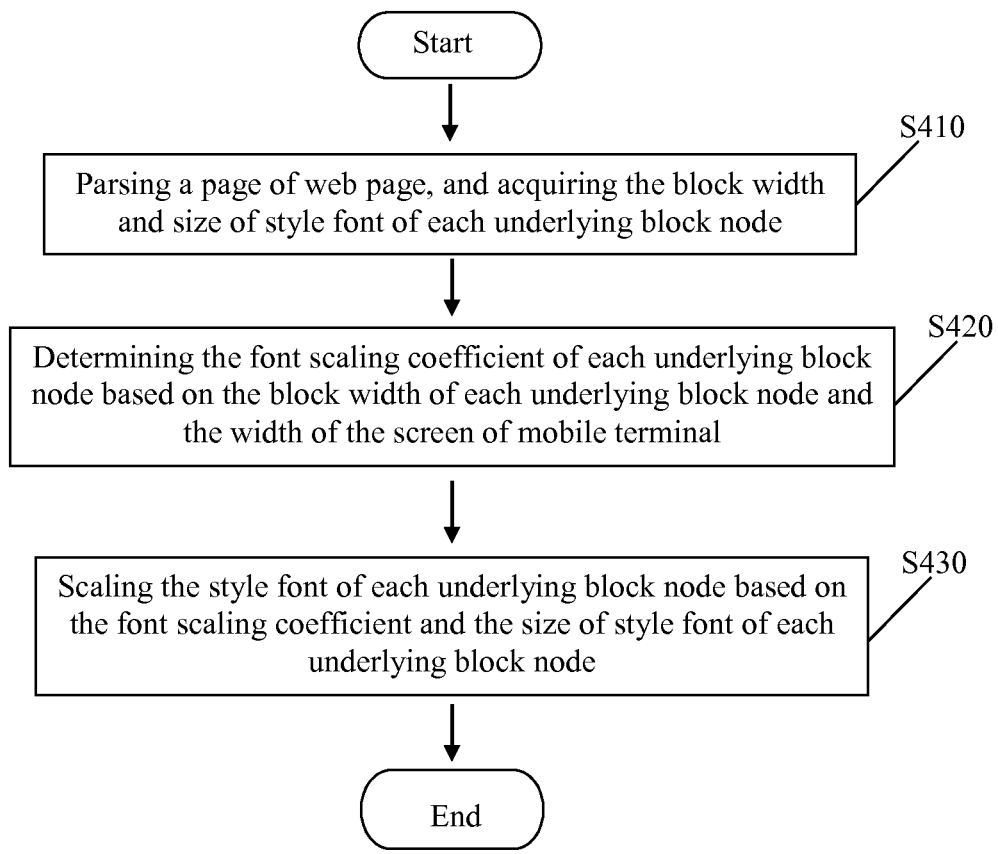
FIG. 4 is a flow chart of the method for scaling font size of a page in mobile terminal according to embodiments of the present invention.

FIG. 4 is a flow chart of the method for scaling the font size of a page in a mobile terminal according to the present invention.

As shown in FIG. 4, firstly, in the step S410, the following procedure has been performed, parsing a type setting processed page of a web page acquired from a content server, and acquiring the block width of each underlying block node and the size of a style font contained in a render tree of the parsed web page, wherein the underlying block nodes are the block nodes that do not contain a sub-block node in the render tree of the web page. For example, after obtaining a type setting processed web page from a content server, the render tree of the web page may be traversed, so as to acquire the block width of each underlying block node and the size of a style font of the underlying block node contained in the render tree of the parsed web page, wherein the render tree has undergone a type setting processing by the content server. The foregoing mentioned render tree may comprise both block node and sub-node, wherein the block node may be, for example, the node of RenderBlock in the render tree, and wherein the sub-node may be the node of RenderBlock or node of RenderInline in the render tree. In addition, the block node may comprise sub-block node or non-block node as its sub-node. Typically, a node of RenderBlock may be the sub-node of another node of RenderBlock. However, a node of RenderInline can only be a sub-node that is contained in a block node, rather than a block node that contains sub-node. The node of RenderInline mentioned herein can be, for example, a node of text, or may be a node of other content, such as picture, tag and the like. Moreover, the above mentioned underlying block node refers to the block node that does not contain sub-node in a render tree. In other words, in the case that an underlying block node contains sub-node, none of the sub-node is a block node. Further, in the case that the underlying block node is a node of text, it must contain a sub-node, and that the sub-node is a node of text.

Subsequently, in the step S420, the following procedure has been performed, based on the acquired block width of each underlying block node and the width of a screen of a mobile terminal, determining a font scaling coefficient of each underlying block node. For instance, in one embodiment of the present invention, the font scaling coefficient of each underlying block node=block width of each underlying block node/width of a screen of a mobile terminal. Alternatively, in other embodiments of the present invention, the font scaling coefficient of each underlying block node may be determined according to other equations, for example, the font scaling coefficient of each underlying block node=k*block width of each underlying block node/width of a screen of a mobile terminal, wherein k can be set as any value by a user according to the user's specific need.

Next, in the step S430, the following procedure has been performed, based on the determined font scaling coefficient of each underlying block node and the size of the style font of each underlying block node, scaling the style font of each underlying block node. For instance, in one embodiment of the present invention, the above mentioned process of based on the determined font scaling coefficient of each underlying block node and the size of the style font of each underlying block node, scaling the style font of each underlying block node comprises: calculating a scaled font size of each underlying block node based on the determined font scaling coefficient of each underlying block node and the acquired size of the style font of each underlying block node; as well as updating the size of style font of each underlying block node in the render tree of the web page based on the scaled font size of each underlying block node. In this regard, the step of calculating the scaled font size of each underlying block node based on the determined font scaling coefficient of each underlying block node and the acquired size of the style font of each underlying block node may be implemented through multiplying the determined font scaling coefficient of each underlying block node by the acquired size of the style font of each underlying block node, and the product obtained from the foregoing calculation can then be used as the scaled font size of the underlying block node.

Preferably, following the processing steps described above, the method according to the present invention further comprises: by virtue of the render tree of the updated web page, rendering the web page on the screen of the mobile terminal, so as to display the web page following the scaling process of font size of the page on the screen of the mobile terminal. That is to say, during the rendering process, for each underling block node in the render tree, perform a rendering process with the updated size of style font of the underling block node.

In addition, preferably, following the step of based on the acquired block width of each underlying block node and the width of a screen of a mobile terminal, determining a font scaling coefficient of each underlying block node, the method according to the present invention further comprises: for each underlying block node, determining whether the previously determined font scaling coefficient of the underlying block node is greater than a first threshold; as well as in the case that the previously determined font scaling coefficient of the underlying block node is greater than the first threshold, based on the previously determined font scaling coefficient of each underlying block node and the acquired size of the style font of the underlying block node, scaling the style font of the underlying block node; alternatively, in the case that the previously determined font scaling coefficient of the underlying block node is not greater than the first threshold, not scaling the style font of the underlying block node.

For example, in one embodiment of the present invention, under the condition that the font scaling coefficient of each underlying block node=block width of each underlying block node/width of a screen of a mobile terminal, the first threshold is 1. In addition, in the cases that the font scaling coefficient has been calculated according to different equations, the first threshold may equal to other suitable values.

Further, preferably, in another embodiment of the present invention, the above mentioned each underlying block node may also comprise one or a plurality of sub-node. In such a case, the process of based on the determined font scaling coefficient of each underlying block node and the acquired size of the style font of each underlying block node, scaling the style font of each underlying block node may also comprises the step of for each sub-node in each underlying block node, determining whether the sub-node is a node of text; as well as in the case that the sub-node is a node of text, scaling the style font of the sub-node based on the determined font scaling coefficient and the acquired size of the style font of the sub-node; alternatively, in the case that the sub-node is not a node of text, not scaling the style font of the sub-node. In this context, as for the sub-node in each underlying block node, in the case that the size of style font of the sub-node has not been further defined in the underlying block node, the size of style font of the sub-node is equal to the size of style font of the underlying block node. Nevertheless, in the case that the size of style font of the sub-node has been defined in the underlying block node, then according to this definition in the underlying block node, acquire the size of style font of the sub-node.

Further, preferably, in another embodiment of the present invention, the method according to the present invention may also comprise: based on a style file of the underlying block node, identifying a text length of the text contained in the underlying block node; and then comparing the identified text length with a second threshold; as well as in the case that the identified text length is greater than the second threshold, scaling the underlying block node; while in the case that it is not greater than the second threshold, not scaling the underlying block node. In this context, the second threshold may be any value set by a user.

Furthermore, preferably, in another embodiment of the present invention, following the procedure of parsing a type setting processed web page acquired from a content server, and acquiring the block width of each underlying block node and the size of a style font contained in a render tree of the parsed web page, the method according to the present invention further comprises the steps as follows: clustering the underlying block nodes contained in the render tree of the web page; and treating a plurality of underlying block nodes following the foregoing clustering process as a single cluster of block node, and selecting the block width and the size of style font of any underlying block node of the plurality of underlying block nodes as the block width and the size of style font of the cluster of block node to calculate the block width and the size of style font of the cluster of block node. In this context, the cluster refers to a type of node that is formed by two or more than two nodes that are adjacent to one another in the type setting structure (which typically refers to adjacent in vertical direction) and are similar in typesetting style, as well as are located in the same block node. The cluster of block node needs to meet the conditions set forth below: (1) the underlying block nodes of the cluster of block node are neighboring underlying block nodes; and (2) every underlying block node within the cluster of block node is included in the same father block node. Typically, as shown in one embodiment of the present invention, the determination for whether a cluster of block node needs to be scaled can be carried out based on whether the text length of a text contained in a cluster of block node (in other words, the text contained in each block node of the cluster of block node) is greater than the second threshold. In addition, the cluster of block node will be scaled only in the case that the text length of a text contained in a cluster of block node is greater than the second threshold.

Figure 5:
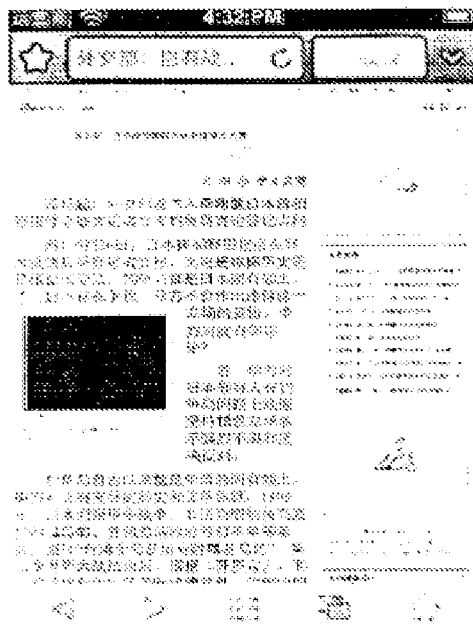
FIG. 5 is a schematic view that shows the screen display of a mobile terminal following a process of scaling font size of a page according to the method of the present invention.

FIG. 5 is a schematic view that shows the screen display of a mobile terminal following a process of scaling font size of page according to the method of the present invention. Through a comparison between FIG. 5 and FIG. 1, it could be seen that the font shown in the left content block in FIG. 5, which has been scaled, is larger than the font shown in the left content block in FIG. 1. In addition, it could also be seen in FIG. 5 that due to the reason that based on the previously described calculation process for font scaling coefficient, the calculated font scaling coefficient of the left content block in FIG. 5 is greater than 1, and accordingly, the font in the left content block in FIG. 5 has been scaled; while the calculated font scaling coefficient of the right content block in FIG. 5 is not greater than 1, as a result, the font in the right content block in FIG. 5 has not been scaled.

Figure 6A:
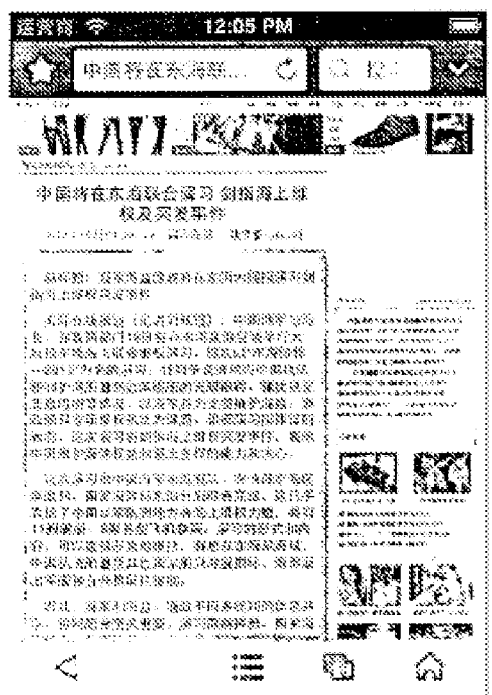
FIGS. 6A and 6B are schematic views that show the screen display of a page of a web page following a process according to the method of the present invention and the screen display following a double click scaling for the content block on the web page.
Figure 6B:
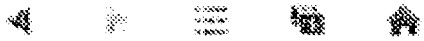

FIGS. 6A and 6B are schematic views that show the respective screen displays following double click scaling on two content blocks of a web page according to the method of the present invention, in which FIG. 6A is a schematic view that shows the screen display of the entire web page following the scaling process for font size of page according to the present invention, while FIG. 6B is a schematic view that shows the screen display following a double click scaling operation to the left content block on the web page shown in FIG. 6A. With a comparison of FIG. 6A and FIG. 6B, it could be seen that the text shown in FIG. 6B becomes clear and easy to read. Moreover, with respect to FIG. 6A, the content layout shown in FIG. 6B has no change, and thus there is no need for rearrangement.

Figure 7A:
FIGS. 7A and 7B are schematic views that show the screen display of a web page through a conventional browser and the screen display following a double click scaling for the content block on the web page.
Figure 7B:

FIG. 7A to 7B are schematic views that show the respective screen displays following double click scaling on respective content blocks on the web page through a conventional browser, in which FIG. 7A is a schematic view of a screen display of the entire web page shown through a conventional browser; while FIG. 7B is schematic view of a screen display following a double click scaling process for the left content block of the web page shown in FIG. 7A. As shown in FIG. 7B, the font in the content block shown in the screen display following the scaling process still cannot be clearly recognized.

In reference to FIG. 4 to FIG. 7B, the method for scaling the font size of a page in a mobile terminal according to the present invention has been described in details. It should be noted that the description provided above is merely for the purpose of describing the present invention, rather than limiting the scope of the present invention. A person of ordinary skill in the art is able to make amendment, substitution and combination to each aspect involved in the embodiments described above without departing from the spirit and scope of the present invention. For instance, the above described various processes of determination may be combined in any form of combination in order to implement the method for scaling the font size of a page in a mobile terminal according to the present invention. Alternatively, the above described various embodiments and preferred modes may be combined in any form of combination in order to implement the method for scaling the font size of a page in a mobile terminal according to the present invention.

Moreover, according to the method for scaling the font size of a page in a mobile terminal of the present invention may be implemented through software, hardware or a combination of both software and hardware.

Figure 8:
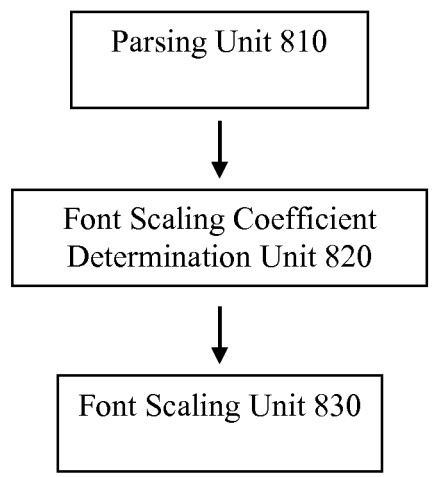
FIG. 8 is a schematic block view of the device for scaling the font size of a page in a mobile terminal according to the present invention.

FIG. 8 is a schematic block view of the device for scaling font size of page 800 in mobile terminal according to the present invention. As shown in FIG. 8, the device 800 for scaling font size of page may include a parsing unit 810, a font scaling coefficient determination unit 820, and font scaling unit 830.

The parsing unit 810 is used for parsing a type setting processed web page acquired from a content server, and acquiring the block width and the size of a style font of each underlying block node contained in a render tree of the parsed web page, wherein the underlying block nodes are the block nodes that do not contain sub-block node in the render tree of the web page.

The font scaling coefficient determination unit 820 is used for determining a font scaling coefficient of each underlying block node, based on the acquired block width of each underlying block node and the width of a screen of a mobile terminal. For instance, the font scaling coefficient of each underlying block node=block width of each underlying block node/width of a screen of a mobile terminal.

The font scaling unit 830 is used for scaling the style font of each underlying block node based on the determined font scaling coefficient of each underlying block node and the size of the style font.

In addition, the device for scaling font size of page 800 may also comprise a unit for rendering, which is used for rendering the web page on the screen of the mobile terminal with the updated rendering of the web page. More specifically, in a process of rendering the web page, for each underlying block node in the render tree, perform a rendering process by virtue of the updated size of style font of the underlying block node.

Figure 9:
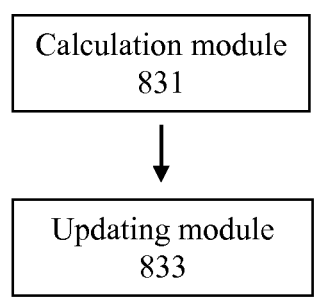
FIG. 9 is a schematic structural view of an example of the unit for font scaling shown in FIG. 8.

FIG. 9 is a schematic structural view of an example of the font scaling unit 830 shown in FIG. 8. As shown in FIG. 9, the font scaling unit 830 may comprise a calculation module 831 and an updating module 833. The calculation module 831 is used for calculating a scaled font size of each underlying block node based on the determined font scaling coefficient of each underlying block node and the acquired size of the style font of each underlying block node. The updating module 833 is used for updating the style font size of each underlying block node in the render tree of the web page based on the scaled font size of each underlying block node. Next, for each underlying block node in the render tree, perform a rendering process by virtue of the updated size of style font of the underlying block node.

In addition, preferably, the scaling font size of page device 800 may also comprise a first determination unit (not shown), which is used for determining whether the previously determined font scaling coefficient of the underlying block node is greater than a first threshold, in respect of each underlying block node. Further, in the case that the previously determined font scaling coefficient of the underlying block node is greater than the first threshold, based on the previously determined font scaling coefficient of each underlying block node and the acquired size of the style font of the underlying block node, the font scaling unit 830 scales the style font of the underlying block node; while in the case that the previously determined font scaling coefficient of the underlying block node is not greater than the first threshold, the font scaling unit 830 does not scale the style font of the underlying block node. For instance, under the condition that the font scaling coefficient of each underlying block node=block width of each underlying block node/width of a screen of a mobile terminal, the first threshold is 1. In addition, in the case that the font scaling coefficient has been calculated according to other equations, the first threshold may equal to other suitable values.

Moreover, preferably, each underlying block node may also comprise one or a plurality of sub-nodes. In such a case, the scaling font size of page device 800 may further comprise a second determination unit (not shown), which is used for determining whether the subject sub-node is a node of text, in respect of each sub-node in the underlying block node; as well as in the case that the sub-node is a node of text, the unit for font scaling scales the style font of the sub-node based on the determined font scaling coefficient and the acquired size of the style font of the sub-node; alternatively, in the case that the sub-node is not a node of text, the font scaling unit 830 does not scale the style font of the sub-node.

Furthermore, preferably, the scaling font size of page device 800 may also comprise a third determination unit (not shown), which is used for determining, for each underlying block node, whether the text length of the text contained in the underlying block node is greater than a second threshold. In the case that the text length of the text contained in the underlying block node is greater than a second threshold, the font scaling unit 830 scales the underlying block node based on the determined font scaling coefficient of the underlying block node and the acquired size of the style font of the underlying block node; while in the case that the text length of the text contained in the underlying block node is not greater than a second threshold, the font scaling unit 830 does not scale the underlying block node. In this context, the second threshold may be any value set by a user.

In the description provided above, although the first determination unit, the second determination unit and the third determination unit have been described as three different determination units, in other embodiments of the present invention, all or any two of the first determination unit, the second determination unit and the third determination unit may be implemented as a single determination unit.

Figure 10:
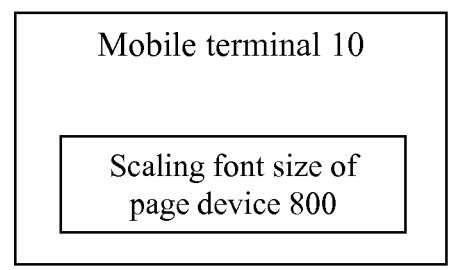
FIG. 10 is a schematic block view of a mobile terminal that contains the device for scaling font size of page according to the present invention.

FIG. 10 is a schematic block view of a mobile terminal that contains the scaling font size of page device according to the present invention. As shown in FIG. 10, the scaling font size of page device contained in the mobile terminal 10 may comprise various modifications of the scaling font size of page device 800 shown in FIG. 8.

In addition, typically, the mobile terminal may be any type of handheld terminal device, such as mobile phone, personal digital assistant (PDA) and the like. As a result, the scope of the present invention should not be limited to a particular type of mobile terminal.

By virtue of the method and device for scaling the font size of a page in a mobile terminal according to the present invention, the underlying block node in the render tree of the style file of the web page can be categorized, and then the font scaling coefficient can be calculated based on the block width of each underlying block node and the width of a screen of a mobile terminal, subsequently, for the text regions in the page, the size of font may be scaled based on the font scaling coefficient. In this way, after a double-click scaling, an enlarged window can completely display a content block and the font thereof can be displayed clearly, without a need to slide the screen to the left or right side. In addition, when the foregoing method is used, there is no need to perform dynamic rearrangement on the scaled content block, thereby saving time on dynamic rearrangement and ensuring that a page layout will not change during the scaling process.

Moreover, by virtue of the method and device for scaling the font size of a page in a mobile terminal according to the present invention, through the procedure as follows, determining whether the font scaling coefficient is greater than 1, and then scaling the font of the underlying block node only in the case that the font scaling coefficient is greater than 1, it is able to avoid the possibility of reducing font size by mistake, which may result in the issue that the difference in font sizes shown in various areas on the same web page are unacceptably big.

Moreover, by virtue of the method and device for scaling the font size of a page in a mobile terminal according to the present invention, through the procedure of determining whether the text length of the text contained in the underlying block node or cluster of block node excesses a predetermined value, it is able to avoid an inappropriately scaling to the font included in those specific areas of the web page, such as page header, page footer and page navigation region. As the displaying result with an up-scaling process to the foregoing areas of the web page may lead to an undesirable experience to a user, the above mentioned procedure according to the present invention is thus able to improve user experience. In addition, through a clustering treatment to the underlying block node, the method according to the present invention is able to avoid the issue that the sizes of font in neighboring elements are different, which may be resulted from different font scaling coefficients used in neighboring elements.

Moreover, by virtue of the method and device for scaling the font size of a page in a mobile terminal according to the present invention, through the procedure of determining whether a sub-node of the underlying block node is a node of text, and then performing a scaling process only in the case that the sub-node is a node of text, it is able to avoid an unnecessary scaling treatment to a node of non-text.

Further, the method according to the present invention may also be implemented by a computer program executable by a central processing unit (CPU). Through the process that the computer program is executed by the CPU, the above described functionalities defined in the method of the present invention is thus implemented.

Further, the method steps and system units described above may also be implemented by a controller or a computer readable program storage device or medium that is used for storing the computer program that allows the controller to implement the foregoing mentioned method steps or unit functions. For example, a mobile terminal according to the present invention may be implemented as one or a plurality of processors, and a memory that is connected to the one or the plurality of processors, in which the memory has been stored of the computer program that comprises the instructions for directing the processor or processors to execute the respective steps defined in the method according to the present invention.

Furthermore, it should be appreciated that the computer readable storage device (for example, memory) described herein can be either a volatile memory or a nonvolatile memory; alternatively, it may include both volatile memory and nonvolatile memory. By way of example and without any limitation, the nonvolatile memory can include read only memory (ROM), programmable ROM (PROM), electrically programmable ROM (EPROM), electrically erasable programmable ROM (EEPROM), or flash memory. The volatile memory can include random access memory (RAM), in which the RAM can act as external cache memory. By way of example and without any limitation, the RAM may be accomplished via a variety of different modes, such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM), and direct Rambus RAM (DRRAM). The disclosed aspects of the storage device include, but are not limited to, the foregoing and other suitable types of memory.

It is also be appreciated to a person of ordinary skill in the art that in combination with the descriptions disclosed herein in the present invention, a variety of logical blocks, modules, circuits, and algorithm steps may be implemented as certain electronic hardware, computer software, or both of the foregoing. In addition, for the purpose of clearly describing the interchangeability between the hardware and software, a general description has already been provided herein in respect of various exemplary components, blocks, modules, circuits, and functionalities of steps thereof. On the other hand, the issue of whether such functionality will be implemented as software or hardware depends on the specific application and the respective design constraints imposed to the entire system thereof. Further, a person of ordinary skill in the art may be able to implement a described functionality in a wide variety of different ways in respective applications. Nevertheless, those various implementations should not be considered as departing from the scope of the present invention.

In combination with the descriptions disclosed herein in the present invention, the variety of logical blocks, modules, circuits, and algorithm steps may be implemented or executed by virtue of the following components that are designed to execute the respective functionalities described herein. These components include: a general purpose processor, a digital signal processor (DSP), an application specific integrated circuit (ASIC), a field programmable gate array (FPGA) or other programmable logic devices, discrete gate or transistor logic, a discrete hardware component or any combination of the foregoing. In addition, the general purpose processor may be a microprocessor, but in the alternative, the processor may be any conventional processor, controller, microcontroller, or state machine. Further, a processor may also be implemented as a combination of various computing devices, such as a combination of a DSP and a microprocessor, a plurality of microprocessors, one or a plurality of microprocessors in conjunction with a DSP core, or any other similar configuration.

In combination with the descriptions disclosed herein in the present invention, the steps of the method or algorithm may be directly embodied in hardware, in a software module executable by a processor, or in both of the foregoing. A software module may reside in RAM memory, flash memory, ROM memory, EPROM memory, EEPROM memory, registers, hard disc, removable disc, CD-ROM, or any other type of storage medium that is known in the art. An exemplary storage medium may be coupled to a processor, such that the processor that can read information from or write information to the storage medium. Moreover, in an alternative mode, the storage medium may be integrated to the processor. Further, the processor and the storage medium may reside in an ASIC; and an ASIC may reside in a user terminal. In one alternative, the processor and the storage medium may reside as discrete components in a user terminal.

In one or a number of exemplary designs, the mentioned functions may be implemented in hardware, software, firmware, or any combination thereof. If implemented in software, the respective functions may be stored in a computer readable medium as one or a plurality of instructions or codes, which are stored in or transferred through a computer readable medium. In this context, the computer readable medium includes both computer storage medium and communication medium, in which the communication medium includes any medium that is able to facilitate transferring a computer program from one location to another location, while the storage medium is any available medium that is accessible by a general purpose or special purpose computer. By way of example and without any limitation, the computer readable media can comprise RAM, ROM, EEPROM, CD-ROM or other optical disc storage device, magnetic disc storage device or other magnetic storage devices, or any other medium that can be used to carry or store the program code in the form of instruction or data structure and can be accessed by a general purpose or special purpose computer. Moreover, any type of connection may be properly termed as a computer readable medium. For example, in the case that a coaxial cable, fiber optic cable, twisted pair cable, digital subscriber line (DSL), or a wireless technology such as infrared, radio, and microwave is used to transfer a software from a website, server, or other remote source, the coaxial cable, fiber optic cable, twisted pair cable, DSL, or as the wireless technology such as infrared, radio, and microwave are all included in the definition of medium. As used herein, the magnetic disc and optical disc include compact disc (CD), laser disc, optical disc, digital versatile disc (DVD), floppy disc and Blu-ray disc, in which a magnetic disc usually reproduces data magnetically, while an optical disc reproduces data optically through laser. Further, a combination of the above described content is also encompassed within the scope of computer readable medium.

Although the foregoing disclosure shows the exemplary embodiments of the present invention, it should be noted that various possible changes and modifications thereof may be made without departing from the scope of the present invention as defined by the claims thereof. In addition, it is not necessary to implement in any particular order or orders for the respective functions, steps and/or actions claimed in the respective claims that are directed to the method of the present invention based on the embodiments described herein. Furthermore, although the elements of the present invention may be described or claimed in the singular form thereof, they may also be in form of a plurality of pieces, unless explicitly restricted to be singular.

Although the various embodiments of the present invention have been described in reference to the drawings, it should be understood to a person of ordinary skill in the art that various modifications may be made to the embodiments of the present invention described above without departing from the content of the present invention. Therefore, the scope of the present invention should be determined by the appended claims.

That which is claimed:

1. A method for scaling a font size of a page in a mobile terminal, comprising:
    parsing a type setting processed page of a web page acquired from a content server, and acquiring a block width and a size of a style font of each underlying block node contained in a render tree of the type setting processed page of the web page;
    generating a clustered block node comprising a plurality of underlying block nodes contained in the render tree of the type setting processed page of the web page, wherein each of the plurality of underlying block nodes in the clustered block node (1) is adjacent to one another in a vertical direction of a type setting structure on the type setting processed page, (2) is a sub-node to a same father block node in the render tree of the type setting processed page of the web page, and (3) contains no sub-node in the render tree;
    subsequent to generating the clustered block node, calculating a font scaling coefficient of the clustered block node that is applicable to the plurality of underlying block nodes, comprising:
        setting the block width and the size of the style font of a first underlying block node of the clustered block node as a block width and a size of a style font of the clustered block node;

determining the font scaling coefficient of the clustered block node based on multiplying a user defined value by the block width of the clustered block node, divided by a width of a screen of the mobile terminal; and scaling the style font of each of the plurality of underlying block nodes of the clustered block node based on the font scaling coefficient of the clustered block node and the size of the style font of the clustered block node, comprising:

scaling the style font of a second underlying block node of the clustered block node based on the font scaling coefficient, wherein the second underlying block node is different from the first underlying block node.

2. The method of claim 1 further comprising:
generating a plurality of clustered block nodes;
calculating a scaled font size of each clustered block node based on the font scaling coefficient of each clustered block node and the size of the style font of each clustered block node; and
updating the size of the style font of each clustered block node in the render tree of the type setting processed page of the web page based on the scaled font size of each clustered block node.

3. The method of claim 1, wherein determining the font scaling coefficient of the clustered block node based on the acquired block width of the clustered block node and the width of the screen of the mobile terminal further includes:
determining whether the font scaling coefficient of the clustered block node is greater than a font scaling coefficient threshold;
in response to determining that the font scaling coefficient of the clustered block node is greater than the font scaling coefficient threshold, based on the font scaling coefficient and the size of the style font of the clustered block node, scaling the style font of each of the plurality of underlying block nodes in the clustered block node; and
in response to determining that the font scaling coefficient of the clustered block node is not greater than the font scaling coefficient threshold, not scaling the style font of each of the plurality of underlying block nodes in the clustered block node.

4. The method of claim 1, wherein each underlying block node includes one or more sub-nodes, and wherein, based on the font scaling coefficient of each clustered block node and the size of the style font of the clustered block node, scaling the style font of each clustered block node includes:
for each sub-node in the underlying block node, determining whether the sub-node is a node of text;
in response to determining that the sub-node is a node of text, scaling a style font of the sub-node based on the font scaling coefficient of the underlying block node and a size of the style font of the sub-node; and
in response to determining that the sub-node is not a node of text, not scaling the style font of the sub-node.

5. The method of claim 1 further comprising, in the case that a text length of a text contained in the clustered block node is greater than a text length threshold, scaling the clustered block node.

6. The method of claim 1, wherein the same father node is a RenderBlock node, wherein at least one of the first underlying block node and the second underlying block node is a RenderInline node.

7. The method of claim 1, wherein scaling the style font of each of the plurality of underlying block nodes of the clustered block node further comprises:
calculating a text length of each underlying block node of the clustered block node;
determining that the text length of each underlying block node is greater than a text length threshold; and
in response to determining that the text length of each underlying block node is greater than the text length threshold, scaling the style font of each of the plurality of underlying block nodes of the clustered block node.

8. A device, comprising:
a parsing unit, configured to:
parse a type setting processed page of a web page acquired from a content server, and acquire a block width and a size of a style font of each underlying block node contained in a render tree of the type setting processed page of the web page;
generate a clustered block node comprising a plurality of underlying block nodes contained in the render tree of the type setting processed page of the web page, wherein each of the plurality of underlying block nodes in the clustered block node (1) is adjacent to one another in a vertical direction of a type setting structure on the type setting processed page, (2) is a sub-node to a same father block node in the render tree of the type setting processed page of the web page, and (3) contains no sub-node in the render tree;
set the block width and the size of the style font of a first underlying block node of the clustered block node as a block width and a size of a style font of the clustered block node;
a font scaling coefficient determination unit, configured to determine a font scaling coefficient of the clustered block node that is applicable to the plurality of underlying block nodes based on multiplying a user defined value by the block width of the clustered block node, divided by a width of a screen of a mobile terminal; and
a font scaling unit, configured to scale the style font of each of the plurality of underlying block nodes of the clustered block node based on the font scaling coefficient of the clustered block node and the size of the style font of the clustered block node, comprising scaling the style font of a second underlying block node of the clustered block node based on the font scaling coefficient, wherein the second underlying block node is different from the first underlying block node.

9. The device of claim 8, wherein the parsing unit is configured to generate a plurality of clustered bock nodes, wherein the font scaling unit includes:
a calculation module, configured to calculate a font size after the scaling of each clustered block node based on the font scaling coefficient of each clustered block node and the size of the style font of each clustered block node; and
an updating module, configured to update the size of the style font of each clustered block node in the render tree of the type setting processed page of the web page based on the font size after scaling of each clustered block node.

10. The device of claim 8, wherein the font scaling unit further comprises a first determination unit, which is used for determining, whether the font scaling coefficient of the clustered block node is greater than a font scaling coefficient threshold, and in response to determining that the font scaling coefficient of the clustered block node is greater than the font scaling coefficient threshold, triggering the font scaling unit to scale the style font of the clustered block node based on the font scaling coefficient of the clustered block node and the size of the style font of each of the plurality of the underlying block nodes of the clustered block node, and in response to determining that the font scaling coefficient of the clustered block node is not greater than the font scaling coefficient threshold, triggering the font scaling unit not to scale the style font of each of the plurality of underlying block node of the clustered block node.

11. The device of claim 8, wherein each underlying block node comprises one or more sub-nodes, and that the device further comprises a second determination unit, configured to determine, for each sub-node in the underlying block node, whether the sub-node is a node of text, and in response to determining that the sub-node is a node of text, trigger the font scaling unit to scale a style font of the sub-node based on the font scaling coefficient of the underlying block node and a size of the style font of the sub-node, and in response to determining that the sub-node is not a node of text, trigger the font scaling unit not to scale the style font of the sub-node.

12. The device of claim 8, wherein the font scaling unit further comprises:

a third determination unit, configured to determine, for each clustered block node, whether a text length of a text contained in the clustered block node is greater than a text length threshold, and in response to determining that the text length of the text contained in the clustered block node is greater than the text length threshold, trigger the font scaling unit to scale the clustered block node based on the font scaling coefficient of the clustered block node and the size of the style font of the clustered block node.

13. The device of claim 8, wherein the same father node is a RenderBlock node, wherein at least one of the first underlying block node and the second underlying block node is a RenderInline node.

14. The device of claim 8, wherein the font scaling unit further comprises:

a third determination unit, configured to:

calculate a text length of each underlying block node of the clustered block node;

determine that the text length of each underlying block node is greater than a text length threshold; and in response to determining that the text length of each underlying block node is greater than the text length threshold, scale the style font of each of the plurality of underlying block nodes of the clustered block node.

15. A non-transitory computer readable medium comprising a program code that is executable by a processor, characterized in that the program code instructs the processor to implement the steps set forth below:

parsing a type setting processed page of a web page acquired from a content server, and acquiring a block width and a size of a style font of each clustered block node contained in a render tree of the type setting processed page of the web page;

generating a clustered block node comprising a plurality of underlying block nodes contained in the render tree of the type setting processed page of the web page, wherein each of the plurality of underlying block nodes in the clustered block node (1) is adjacent to one another in a vertical direction of a type setting structure on the type setting processed page, (2) is a sub-node to a same father block node in the render tree of the type setting processed page of the web page, and (3) contains no sub-node in the render tree;

subsequent to generating the clustered block node, calculating a font scaling coefficient of the clustered block node that is applicable to the plurality of underlying block nodes, comprising:

setting the block width and the size of the style font of a first underlying block node of the clustered block node as a block width and a size of a style font of the clustered block node;

determining the font scaling coefficient of the clustered block node based on multiplying a user defined value by the block width of the clustered block node, divided by a width of a screen of a mobile terminal; and scaling the style font of each of the plurality of underlying block nodes of the clustered block node based on the font scaling coefficient of the clustered block node and the size of the style font of the clustered block node, comprising:

scaling the style font of a second underlying block node of the clustered block node based on the font scaling coefficient, wherein the second underlying block node is different from the first underlying block node.

16. The non-transitory computer readable medium of claim 15, wherein the same father node is a RenderBlock node, wherein at least one of the first underlying block node and the second underlying block node is a RenderInline node.

17. The non-transitory computer readable medium of claim 15, wherein the program code instructs the processor to implement:

calculating a text length of each underlying block node of the clustered block node;

determining that the text length of each underlying block node is greater than a text length threshold; and in response to determining that the text length of each underlying block node is greater than the text length threshold, scaling the style font of each of the plurality of underlying block nodes of the clustered block node.

* * * * *